United States Patent
Such et al.

(10) Patent No.: US 9,518,218 B2
(45) Date of Patent: Dec. 13, 2016

(54) METHOD FOR PRODUCING A DOPED SIO$_2$ SLURRY AND USE OF THE SIO$_2$ SLURRY

(71) Applicant: Heraeus Quarzglas GmbH & Co. KG, Hanau (DE)

(72) Inventors: Mario Such, Graefenhainichen (DE); Gerhard Schoetz, Aschaffenburg (DE); Andreas Langner, Freigericht (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 217 days.

(21) Appl. No.: 14/411,332

(22) PCT Filed: Jun. 25, 2013

(86) PCT No.: PCT/EP2013/063213
§ 371 (c)(1),
(2) Date: Dec. 24, 2014

(87) PCT Pub. No.: WO2014/001293
PCT Pub. Date: Jan. 3, 2014

(65) Prior Publication Data
US 2015/0197688 A1    Jul. 16, 2015

(30) Foreign Application Priority Data
Jun. 26, 2012 (DE) .................. 10 2012 012 524

(51) Int. Cl.
*C09K 11/77* (2006.01)
*C01B 33/18* (2006.01)
*C03B 19/06* (2006.01)
*C09K 11/02* (2006.01)
*C03C 1/00* (2006.01)
*C03C 4/12* (2006.01)
*C03C 3/06* (2006.01)

(52) U.S. Cl.
CPC .......... *C09K 11/7706* (2013.01); *C01B 33/18* (2013.01); *C03B 19/066* (2013.01); *C03C 1/006* (2013.01); *C03C 3/06* (2013.01); *C03C 4/12* (2013.01); *C09K 11/025* (2013.01); *C03B 2201/06* (2013.01); *C03B 2201/32* (2013.01); *C03B 2201/34* (2013.01); *C03B 2201/36* (2013.01); *C03C 3/061* (2013.01); *C03C 2201/06* (2013.01); *C03C 2201/3488* (2013.01); *C03C 2201/36* (2013.01)

(58) Field of Classification Search
CPC .......... C03C 1/006; C03C 3/06; C03C 3/061; C03C 2201/06; C03C 2201/3488; C03C 2201/36; C03B 2201/06; C03B 2201/32; C03B 2201/34; C03B 2201/36
USPC ................... 252/301.4; 501/54; 65/426
See application file for complete search history.

(56) References Cited

U.S. PATENT DOCUMENTS

| | | |
|---|---|---|
| 6,676,719 B2 | 1/2004 | Lortz et al. |
| 7,637,126 B2 | 12/2009 | Koeppler et al. |
| 7,879,304 B1 | 2/2011 | Ward et al. |
| 8,557,171 B2 | 10/2013 | Langner et al. |
| 2002/0134027 A1 | 9/2002 | Lortz et al. |
| 2002/0168312 A1 | 11/2002 | Mangold et al. |
| 2004/0005352 A1 | 1/2004 | Lopez et al. |
| 2006/0042117 A1 | 3/2006 | Winter et al. |
| 2007/0145332 A1 | 6/2007 | Koeppler et al. |
| 2010/0251771 A1 | 10/2010 | Langner et al. |
| 2010/0301264 A1 | 12/2010 | Mangold et al. |

FOREIGN PATENT DOCUMENTS

| | | |
|---|---|---|
| CN | 1688658 A | 10/2005 |
| CN | 101850230 A | 10/2010 |
| DE | 102004006017 A1 | 7/2005 |
| DE | 10 2007 015 097 A1 | 10/2008 |
| DE | 102007015097 A1 | 4/2009 |
| DE | 10 2007 045 097 A1 | 11/2012 |
| EP | 1 216 958 A2 | 6/2002 |
| EP | 1216956 A2 | 6/2002 |

OTHER PUBLICATIONS

English Language Translation of CN101850230A, published Oct. 6, 2010.
"Spray Drying". Wang Xizhong et al., Chemical Industry Press. Published Feb. 28, 2003.

*Primary Examiner* — Matthew E Hoban
*Assistant Examiner* — James Fiorito
(74) *Attorney, Agent, or Firm* — Tiajoloff & Kelly LLP

(57) ABSTRACT

The invention relates to a method for producing a doped SiO$_2$ slurry in which an SiO$_2$ suspension is brought into interaction with at least one doping solution, wherein the SiO$_2$ suspension and/or the doping solution act on one another in the form of an atomized spray, the average droplet diameter of which is in the range between 10 µm and 100 µm. The invention further relates to the use of an SiO$_2$ slurry doped by the atomized spray method for the production of doped quartz glass, particularly for the production of laser-active quartz glass.

11 Claims, No Drawings

METHOD FOR PRODUCING A DOPED SiO₂ SLURRY AND USE OF THE SiO₂ SLURRY

TECHNICAL BACKGROUND

The present invention refers to a method for producing a doped $SiO_2$ slurry in that a suspension which contains $SiO_2$ particles in an aqueous liquid is continuously fed with at least one doping solution so as to form the doped $SiO_2$ slurry Furthermore, the present invention refers to the use of the doped $SiO_2$ slurry.

PRIOR ART

DE 10 2004 006 017 A1 describes a doped $SiO_2$ slurry for producing laser active quartz glass. For doping the quartz glass with oxides of the rare-earth or transition metals a "powder route" is suggested using a high-purity, homogeneously doped $SiO_2$ granulate. An aqueous suspension which contains $SiO_2$ nanoparticles and dopants is here the starting point. The starting compounds for these dopants are added in the form of water-soluble hydrate compounds $AlCl_3 \times 6H_2O$ and $NdCl_3 \times 6H_2O$.

In a generic method according to DE10 2007 045 097 A1 a homogenized, alkaline $SiO_2$ suspension is fed with dopants in dissolved form and by time-controlled dropwise addition of an aqueous doping solution under constant stirring.

However, the dropwise doping technique only works locally even in the case of the moved slurry because the ions of the doping solution are very rapidly bound to the $SiO_2$ particles of the slurry. As a consequence, the dopant concentration of the $SiO_2$ particles in the slurry may locally vary, which after the further processing of the slurry into a sintered quartz glass will be noticed through corresponding inhomogeneities in the quartz glass.

TECHNICAL OBJECTIVE

It is therefore the object of the present invention to indicate a method for producing a doped $SiO_2$ slurry which ensures an optimum dopant distribution.

It is also the object of the present invention to indicate a suitable use for the doped $SiO_2$ slurry.

GENERAL DESCRIPTION OF THE INVENTION

The above object is achieved according to the invention with respect to the method in that while the emerging doped $SiO_2$ slurry is continuously kept in motion, the $SiO_2$ suspension and/or the doping solution act on another in the form of a spray mist the mean drop diameter of which is in the range between 10 µm and 100 µm.

With the method according to the invention one achieves a fine distribution of the doping solution during the doping process. The doping solution or the $SiO_2$ suspension as the base component is atomized by means of a spray mist apparatus, so that small droplets with a mean drop diameter in the range of 10 µm to 100 µm are produced. Depending on the setting of the atomization nozzle with respect to operating pressure and flow rate, the mean drop size can be adjusted.

Drop diameters ranging between 10 µm and 40 µm are normally referred to as an aqueous mist. By comparison, the size of "normal" rain drops is about 600 µm, so that when liquid drops are added for doping according to the prior art by means of a pipette, drop diameters of about 2 to 5 millimeters can be expected.

In a first alternative of the invention, the doping solution which is atomized as a spray mist is directed onto the $SiO_2$ suspension which, in turn, is intensively agitated by means of a mechanical stirring tool. The spray mist field with its very small drops thereby sweeps over a relatively large surface of the $SiO_2$ suspension, whereby a homogeneous dopant distribution is achieved in the slurry. To minimize losses of doping solution, the nozzle must be guided in a controlled manner over the $SiO_2$ slurry surface.

Alternatively, the $SiO_2$ suspension can also be atomized as the basic component into a spray mist and sprayed onto the doping solution. The doping solution is here continuously agitated.

Both alternatives lead to a doped $SiO_2$ slurry with an optimal dopant distribution.

Apart from the above-explained variants, the object can also be achieved in that both the $SiO_2$ suspension and the doping solution act on one another in the form of a spray mist, the two spray mists having a mean drop diameter in the range between 10 µm and 100 µm.

This method according to the invention leads to a particularly intensive interaction of the droplets of the $SiO_2$ suspension with those of the doping solution because the surface of the two components is maximized in the spray mist. In the spray mist, the two components are optimally mixed with one another, with very small droplets agglomerating into larger drops which accumulate at the bottom as doped $SiO_2$ slurry in a collection vessel.

The aforementioned interaction of the droplets with one another is the more intensive, the smaller the drop size is. Therefore, it has turned out to be particularly advantageous when the mean drop diameter of the spray mist is in the range between 10 µm and 40 µm.

Preferably, the mixing of the spray mist arising from the $SiO_2$ suspension and from the at least one doping solution still takes place in the mist phase, i.e. even before the droplets of the spray mists unite with the surface of the evolving doped $SiO_2$ slurry.

A further advantageous variant of the invention consists in that the $SiO_2$ suspension or/and the doping solution are atomized into a spray mist by using one or more spray nozzles.

The use of more than one spray nozzle ensures a more efficient operation. Moreover, plural spray nozzles can be adjusted in different ways with respect to flow rate, operating pressure and spatial direction, which optimizes contact and interaction of the drops of the spray mist with one another and with the respectively non-atomized component.

Furthermore, it has turned out to be useful that when the spray mist is generated, an operating pressure in the range of 0.5 bar to 10 bar, preferably in the range of less than 5 bar, is used. Moreover, it is advantageous in the generation of the spray mist that a flow rate in the range of 0.2 l/h to 4.0 l/h, preferably in the range of less than 0.5 l/h, is used.

Both parameters, operating pressure and flow rate, substantially determine the spectrum of the drop size and the efficiency of the whole method.

Furthermore, it has turned out to be advantageous with respect to a homogeneous dopant distribution when the $SiO_2$ suspension or the doping solution or the at least partly doped $SiO_2$ slurry is kept in motion by using one or more propeller stirrers.

This measure shows an additional homogenizing effect and prevents the settlement of possibly doped $SiO_2$ particles in the $SiO_2$ slurry.

To ensure an optimal spray mist generation from the SiO$_2$ suspension, it is preferred that the SiO$_2$ suspension and/or the doping solution is filtered prior to the generation of the spray mist.

Possible, rather coarse SiO$_2$ particles which might lead to interruptions or other irregularities in spray mist generation are separated by way of filtration. For instance, the atomizer nozzle might get clogged in the case of excessively large particles, or the desired drop diameters cannot be set. Moreover, rather coarse impurities which are removed by way of filtration might also be present in the doping solution due to the manufacturing process.

A further preferred measure for introducing a particularly homogeneous SiO$_2$ suspension as the base material consists in adjusting the SiO$_2$ suspension to a pH of more than 12. This is e.g. accomplished by adding concentrated ammonia solution. The electrical potential is intensified by the SiO$_2$ particles, which leads to a mutual repulsion of the particles and attenuates the tendency to sedimentation.

A main field of application of the doped SiO$_2$ slurry according to the method according to the invention is the production of doped quartz glass, particularly of laser active quartz glass. Said glass contains dopants effecting an amplification of laser radiation in the host material quartz glass. As a rule, these are rare-earth cations (lanthanides) and/or cations of the so-called transition metals. Further dopants, such as oxides of aluminum, phosphor and boron, are often introduced for adjusting the viscosity and the refractive index of the quartz glass. Particularly high demands are here made on the homogeneity of the dopant distribution to avoid devitrification and formation of nodules and together with this to achieve an amplification performance as high as possible and a low attenuation of the laser radiation to be amplified. Laser active quartz glass can be used in so-called rod, fiber or disk lasers.

Furthermore, the doped SiO$_2$ slurry is used in the production of quartz glass granulate which, in turn, is suited for the manufacture of special quartz glass crucibles, filter glasses, scintillation materials, fluorescent quartz glass, viscosity- or refractive index-adapted quartz glasses, stress rods for polarization maintaining optical fibers, and quartz glass material with special magnetic or electrical properties which are based on the action of the respective dopants.

EMBODIMENTS

The invention will now be explained in more detail with reference to embodiments.

Example 1

For the generation of a quartz glass doped with Yb$_2$O$_3$ and Al$_2$O$_3$, a suspension of discrete SiO$_2$ particles is produced in the form of SiO$_2$ aggregates in ultrapure water. The SiO$_2$ aggregates have a mean particle size of about 10 µm and they consist of SiO$_2$ primary particles with particle sizes in the range of 5 nm to 100 nm. A pH of 14 is set by adding a concentrated ammonia solution. The solids content of the alkaline suspension is 16% by wt.

The homogenized alkaline suspension is fed with dopants in dissolved form and by addition of a spray mist of an aqueous doping solution consisting of AlCl$_3$ and YbCl$_3$ (molar ratio 6:1) of the SiO$_2$ suspension. During this time the SiO$_2$ suspension is vigorously stirred with a propeller stirrer. For the generation of the spray mist the dopant solution is atomized by means of a spray nozzle, with an operating pressure of 2 bar and a flow rate of 0.8 l/h being set. The spray mist produced thereby contains drops with a mean diameter between 10 µm and 40 µm. With this procedure it is ensured that an optimally homogeneously doped SiO$_2$ slurry is obtained.

The high pH value of the suspension directly leads to a mixed precipitation of hydroxides of the two dopants in the form of Al(OH)$_3$ and Yb(OH)$_3$. A dopant concentration of 1 mole % Al$_2$O$_3$ and 0.25 mole % Yb$_2$O$_3$ (based on the SiO$_2$ content of the suspension) is thereby set.

The SiO$_2$ slurry doped thereby is further processed into granulate which, in turn, is sintered into a quartz glass material and is used as a laser active quartz glass. Doped quartz glass which has been produced by means of a doped SiO$_2$ slurry on the basis of the spray mist doping according to the invention exhibits considerably less inhomogeneities than is the case according to dropwise doping according to the prior art. For instance, one can still read standard-size writing e.g. through a rare earth-doped quartz glass sample of a thickness of 10 cm which had a spray mist-doped SiO$_2$ slurry as the starting material. This is otherwise not possible due to scattering caused by striae, which is due to an inhomogeneous distribution of dopants.

Example 2

A spray mist is produced from the alkaline SiO$_2$ suspension with a solids content of 16% by wt. according to Example 1 and also from the doping solution of Example 1. Prior to atomization the SiO$_2$ suspension and the doping solution are filtered for separating coarse particles or other impurities having a size of more than 15 µm by pouring each of the components through a plastic sieve with a corresponding mesh size. If necessary, the passage through the sieve can be supported by means of a plastic spatula especially during filtration of the SiO$_2$ suspension. The SiO$_2$ suspension is then atomized at an operating pressure of 4 to 5 bar and at a flow rate of about 2.4 l/h. By contrast, for the doping solution the operating pressure is set to 2 bar and the flow rate to 0.8 l/h. The atomizer nozzles are positioned over a collection vessel for the doped SiO$_2$ slurry in an oblique downward orientation and at a distance from one another of about 5 cm to 10 cm. The spray mists produced thereby contain drops with a mean diameter between 10 µm and 40 µm.

The atomizer nozzles can be adjusted in their angle relative to one another during the doping process. In addition, it is also possible to move the nozzles according to predetermined patterns, whereby a more intensive interaction of the spray mists is possible. The drops of the spray mists consisting of SiO$_2$ suspension and doping solution act on one another in the upper portion of the collection vessel and finally sink onto the bottom of the collection vessel. Furthermore, in the collection vessel a stirring device is installed that keeps the doped SiO$_2$ slurry, which is collected there, in motion. Like in Example 1, the slurry doped in this manner is further processed into a doped SiO$_2$ granulate which is subsequently used in many ways for the production of the doped quartz-glass material.

The invention claimed is:

1. A method for producing a doped SiO$_2$ slurry, said method comprising:
   providing at least one doping solution continually to a SiO$_2$ suspension that contains SiO$_2$ particles in an aqueous liquid so as to form the doped SiO$_2$ slurry,
   wherein, while the doped SiO$_2$ slurry is being formed, an at least partially doped SiO$_2$ slurry is continuously kept in motion, and wherein the $SiO_2$ suspension and the doping solution act on each other with the $SiO_2$ suspension and/or the doping solution being in the form of a spray mist having a mean drop diameter that is in a range between 10 μm and 100 μm.

2. The method according to claim 1, wherein the mean drop diameter is in a range between 10 μm and 50 μm.

3. The method according to claim 1, wherein the $SiO_2$ suspension and the at least one doping solution are in the form of spray mists and are intermixed in a mist phase thereof.

4. The method according to claim 1, wherein the $SiO_2$ suspension or the doping solution are atomized into the spray mist using one or more spray nozzles.

5. The method according to claim 1, wherein, the spray mist is generated at operating pressure in the range of 0.5 bar to 10 bar.

6. The method according to claim 1, wherein, the spray mist is generated at flow rate in the range of 0.2 l/h to 4.0 l/h.

7. The method according to claim 1, wherein the $SiO_2$ suspension or the doping solution or the at least partly doped $SiO_2$ slurry is kept in motion using one or more propeller stirrers.

8. The method according to claim 1, wherein the $SiO_2$ suspension or the doping solution is filtered prior to the generation of the spray mist thereof.

9. The method according to claim 1, wherein the $SiO_2$ suspension has a pH of more than 12.

10. The method according to claim 1, wherein, the spray mist is generated at operating pressure of less than 5 bar.

11. The method according to claim 1, wherein, the spray mist is generated at flow rate in the range of 0.2 l/h to 0.5 l/h.

* * * * *